(12) United States Patent
Kumar

(10) Patent No.: US 11,230,157 B1
(45) Date of Patent: Jan. 25, 2022

(54) METHOD FOR EXTENDING DURATION OF USE OF REFRIGERANT AND IMPROVING COOLING EFFICIENCY USING MICROCOMPUTER CIRCUITRY AND LOGIC

(71) Applicant: Sivathanu B. Kumar, Tampa, FL (US)

(72) Inventor: Sivathanu B. Kumar, Tampa, FL (US)

(*) Notice: Subject to any disclaimer, the term of this patent is extended or adjusted under 35 U.S.C. 154(b) by 321 days.

(21) Appl. No.: 16/506,200

(22) Filed: Jul. 9, 2019

Related U.S. Application Data

(63) Continuation-in-part of application No. 15/587,073, filed on May 4, 2017, now abandoned, which is a continuation-in-part of application No. 14/817,274, filed on Aug. 4, 2015, now Pat. No. 9,784,465.

(60) Provisional application No. 62/835,808, filed on Apr. 18, 2019, provisional application No. 62/332,346, filed on May 5, 2016, provisional application No. 62/033,598, filed on Aug. 5, 2014.

(51) Int. Cl.
*B60H 1/00* (2006.01)
*B60H 1/32* (2006.01)

(52) U.S. Cl.
CPC ..... *B60H 1/00407* (2013.01); *B60H 1/00742* (2013.01); *B60H 1/00885* (2013.01); *B60H 1/00971* (2013.01); *B60H 1/3235* (2013.01); *B60H 2001/3266* (2013.01)

(58) Field of Classification Search
CPC ............ B60H 1/00407; B60H 1/00742; B60H 1/00885; B60H 1/00971; B60H 1/3235; B60H 2001/3266
See application file for complete search history.

(56) References Cited

U.S. PATENT DOCUMENTS

| | | | |
|---|---|---|---|
| 2009/0193825 A1* | 8/2009 | Hara | B60H 1/00657 62/132 |
| 2014/0070943 A1* | 3/2014 | Breed | B60R 21/01516 340/539.11 |

* cited by examiner

*Primary Examiner* — Michael D Lang

(57) ABSTRACT

A method comprises the steps of using microcomputer circuitry and logic generating data format providing activation and deactivation of a portable air cooling unit and operating the blower fan at differing speeds optimizing and conserving the rate of expending pre-cooled refrigerant. First, deactivating the unit during periods when cooling is unnecessary. Using sensors, including proximity sensors, for sensing the data format of individuals. The logic upon detecting an individual within the predefined range generates data format activating the chilled air output and deactivating the unit upon not sensing objects. The data format associated with the objects, dimensional aspect of range and operations of the portable air cooling unit are stored in the memory. Additionally, the active coupling of the temperature sensors operates the fan at lower speeds when the outside temperature is within the cooler temperature setting spectrum. Alternatively, switches are provided for operating the portable air cooling units.

10 Claims, 3 Drawing Sheets

30

60

METHOD FOR EXTENDING DURATION OF USE OF REFRIGERANT AND IMPROVING COOLING EFFICIENCY USING MICROCOMPUTER CIRCUITRY AND LOGIC

RELATED APPLICATIONS

This application is a continuation-in-part of U.S. patent application Ser. No. 15/587,073 filed May 4, 2017 and is based upon Provisional Applications 62/835,808 filed Apr. 18, 2019, and 62/332,346 filed May 5, 2016 and is a continuation-in-part of application Ser. No. 14/817,274 entitled "Portable Air Cooling System and Method" filed Aug. 4, 2015, which is based upon Provisional Application No. 62/033,598 entitled "Method and System for a Portable Air Cooling System for General Use in Vehicles including Golf Carts" filed Aug. 5, 2014, the subject matter of which applications is incorporated herein by reference.

BACKGROUND OF THE INVENTION

Field of the Invention

The present invention relates to a method for extending duration of use of refrigerant and improving cooling efficiency using microcomputer circuitry and logic and more particularly pertains to providing cooled air for mobile use for a user including in a golf cart safe, convenient, and economical manner.

Description of the Prior Art

The use of portable air cooling methods of known designs and configurations is known in the prior art. More specifically, portable air cooling methods of known designs and configurations previously devised and utilized for the purpose of providing cool air to a user are known to consist basically of familiar, expected, and obvious structural configurations, notwithstanding the myriad of designs encompassed by the crowded prior art which has been developed for the fulfillment of countless objectives and requirements.

While the prior art devices fulfill their respective, particular objectives and requirements, the aforementioned patents do not describe a method for extending duration of use of refrigerant and improving cooling efficiency using microcomputer circuitry and logic that provides portable air cooling generally for mobile use including golf carts in a safe, convenient, and economical manner.

In this respect, the portable air cooling system according to the present invention substantially departs from the conventional concepts and designs of the prior art, and in doing so provides an apparatus primarily developed for the purpose of providing portable air cooling generally for mobile use including golf carts in a safe, convenient, and economical manner.

Therefore, it can be appreciated that there exists a continuing need for a new and improved method for extending duration of use of refrigerant and improving cooling efficiency using microcomputer circuitry and logic which can be used for providing cooled air for mobile use for a user including in a golf cart safe, convenient, and economical manner. In this regard, the present invention substantially fulfills this need.

SUMMARY OF THE INVENTION

In view of the foregoing disadvantages inherent in the known types of portable air cooling methods of known designs and configurations now present in the prior art, the present invention provides an improved method for extending duration of use of refrigerant and improving cooling efficiency using microcomputer circuitry and logic. As such, the general purpose of the present invention, which will be described subsequently in greater detail, is to provide a new and improved method for extending duration of use of refrigerant and improving cooling efficiency using microcomputer circuitry and logic which has all the advantages of the prior art and none of the disadvantages.

To attain this, the present invention is essentially a method comprising the steps of using microcomputer circuitry and logic mechanism for regulating the operational functions of portable air cooling units, installing program and logic in a programmer and processor for signaling and generating specific data format, operably coupling electronic sensors with microcomputer circuitry and logic mechanism detecting individuals within a predefined range and the logic generating signals regulating the operations of the portable air cooling units including switching on and off the portable air cooling units.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved method for extending duration of use of refrigerant and improving cooling efficiency using microcomputer circuitry and logic which has all of the advantages of the prior art portable air cooling methods of known designs and configurations and none of the disadvantages.

It is another object of the present invention to provide a new and improved method for extending duration of use of refrigerant and improving cooling efficiency using microcomputer circuitry and logic which may be easily and efficiently manufactured and marketed.

It is a further object of the present invention to provide a new and improved method for extending duration of use of refrigerant and improving cooling efficiency using microcomputer circuitry and logic which is of durable and reliable constructions.

An even further object of the present invention is to provide a new and improved method for extending duration of use of refrigerant and improving cooling efficiency using microcomputer circuitry and logic which is susceptible of a low cost of manufacture with regard to both materials and labor, and which accordingly is then susceptible of low prices of sale to the consuming public, thereby making such method for extending duration of use of refrigerant and improving cooling efficiency using microcomputer circuitry and logic economically available to the buying public.

Lastly, it is still another object of the present invention is to provide a method for extending duration of use of refrigerant and improving cooling efficiency using microcomputer circuitry and logic for providing cooled air for mobile use for a user including in a golf cart safe, convenient, and economical manner.

These together with other objects of the invention, along with the various features of novelty which characterize the invention, are pointed out with particularity in the claims annexed to and forming a part of this disclosure.

For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various Figures.

DESCRIPTION OF THE PREFERRED EMBODIMENT

Figure 1:
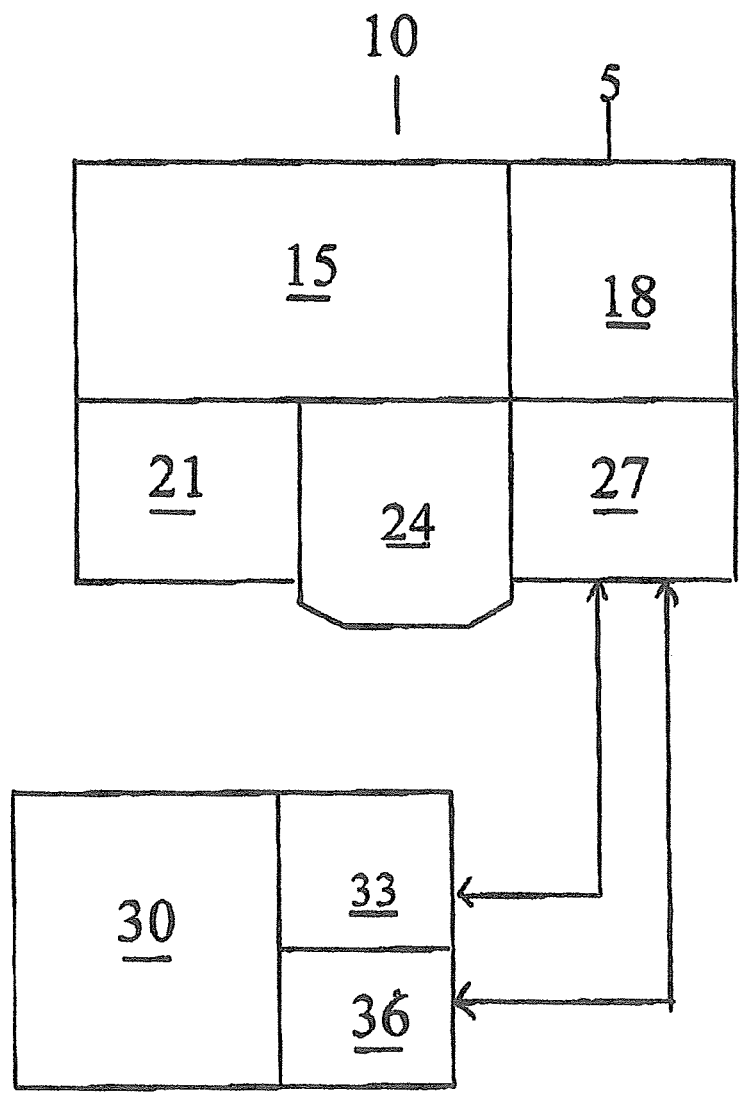
FIG. 1 is block diagram of the preferred method of the present invention.
Figure 2:
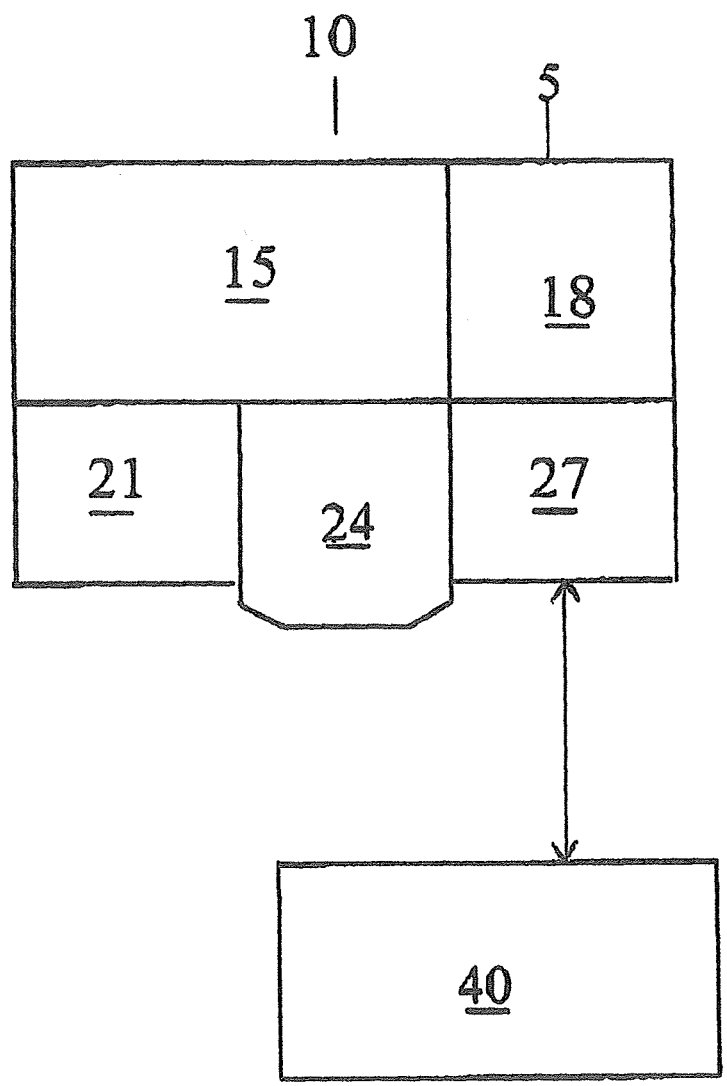
FIG. 2 is a block diagram of an alternate method of the present invention.
Figure 3:
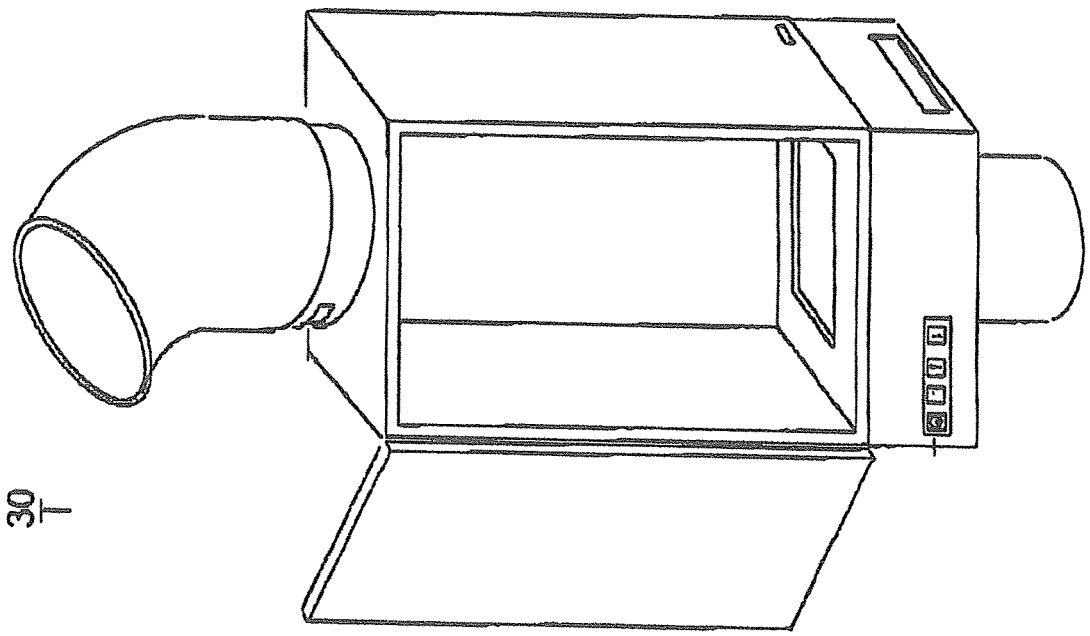
FIG. 3 is a perspective front view of the portable air cooling system constructed in accordance with the principles of the present invention shown including the air cooling assembly.
Figure 3:
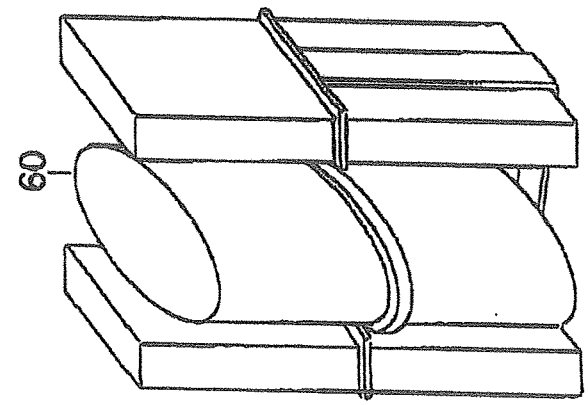

With reference now to the drawings, and in particular to FIG. 1 thereof, the preferred embodiment of the new and improved method for extending duration of use of refrigerant and improving cooling efficiency using microcomputer circuitry and logic embodying the principles and concepts of the present invention and generally designated by the reference numeral 10 will be described.

The present invention provides a method for extending duration of functionality of an expending pre-cooled refrigerant 60 that is being used in a portable air cooling units 30 to cool a specific area and also to improve efficiency of a portable cooling unit by conserving the use of the chilled refrigerated refrigerant packs and containers that are used for cooling a specific zone. It should be noted that the refrigerant packs that are necessary to provide desired chilled air to the golfers riding in the carts particularly in geographical regions warm weather are heavy and takes up considerable amount of space in the golf cart. These heavy amounts of frozen refrigerant packs are also difficult to handle. So the object of this invention is improve the efficiency by providing users of this air cooler maximum period comfortable cooled air output using minimum amount of frozen refrigerant packs. This concept works well in this application in golf game as the golfers ride their cart to the each location to hit the next shot and they are getting off the golf carts to hit the next play. This duration of time where the golfers are not seated in the cart adds up to considerable time, approximately one fourth of the time spent golfing. So switching off the blower fan while the golfers are not seated in the golf cart extends the self-life of the refrigerant packs considerably resulting output of desirable chilled air and also the requiring to carry a smaller amount of frozen refrigerant packs that are needs for the operation of the air cooler system and that is placed in the golf cart and carried around for cooling. This is done by reducing and limiting the continuous operation of the portable air cooling units (30) when used in vehicles including golf carts. The microcomputer circuitry and logic mechanism is programed to switch on and off portable air cooling units 30 and to regulate operations such as regulating the speed of the blower fan.

The regulating the speed of the fan by use of temperature sensors operably coupled with the with the microcomputer circuitry and logic, the temperature sensors providing the outside the data format aspect of external temperature of the area, the data format associated with the temperature aspect including specific temperature setting are stored in the memory of the microcomputer circuitry and logic, depending upon external temperature the microcomputer circuitry and logic triggering and generating signals to vary and maintain speeds of the blower fan, during the early morning hours when the outside temperature is relatively cooler the fan if run in a slower speeds during the periods when optimum cooling is not necessary thus conserving the rate of expending pre-cooled refrigerant provided for cooling of air within the portable air cooling system and output of volume of air and the computer logic generates signals that activate, deactivate and regulate the portable air cooling units (30). The electronic sensors operably coupled with the microcomputer circuitry and logic mechanism detects the presence of an individual/person is seated in the seat that is within the predefined space and switches on and activates the portable air cooling units 30.

The microcomputer circuitry and logic mechanism 10 switches off and deactivates the portable air cooling units 30 upon the electronic sensors detecting that no one is seated or present within the predefined range which is also represent thety predefined space that is stored in the memory 21. The portable air cooling units 30 is also switched off when the computer logic detects the person seated or present or seated within predefined range moves away and out of the predefined range, the data format of range are preinstalled in the memory 21 by manufacturers of this system or by the users of this system. The electronic motion (active and passive) and proximity sensors that are operably coupled with the microcomputer circuitry and logic mechanism detects the presence of a person (a driver or the passengers of the golf cart) when they are within a predefined range and generates signals to the microcomputer circuitry and logic mechanism and the computer logic of the microcomputer circuitry and logic mechanism 10 in turn generates signals to regulate the operations of the portable air cooling units 30. Thus optimizes the efficiency and extends the useful lifespan of the chilled refrigerant and provides cooling for a longer period of time.

The device 5 is comprised of at least a portable microcomputer comprising a microcomputer circuitry and logic mechanism 10 further comprising in combination at least a processor 15, programmer and logic 18, a memory 21, communication circuitry and protocol 27 adapted to exchange data format and providing active and operable coupling with a plurality of remote systems including smart phones and portable computer and communication devices and a plurality of components including switches 33 and regulator 36 of the portable air cooling units.

The method also includes several selections of methods and sensors for detecting the presence of a person within a specific space and the data format of the predefined space is installed in the computer logic as a range. Several selections of methods for detecting the location of a person are provided and they include at least the active and passive motion sensors, proximity sensors, touch sensors and pressure and weight activated switches.

The last step is providing communication circuitry and protocol 27 for exchanging of data format and actively and operationally connecting the microcomputer circuitry and logic mechanism 10 with other remote systems such as an electronic air condition control module 40 of a vehicle. The programmer and processor of the microcomputer circuitry and logic mechanism 10 are programed and installed with logic and data format that signal and generate the data format that regulate and the flow of heated/chilled air for an air-condition unit to specific sections and also to distribute of air to specific zones of a vehicle based on the presence, absence and distribution of drivers and passengers within the vehicle.

Alternatively plurality methods and sensors are provided for detecting a predefined object including a person located within a predefined range actuating switches including pressure and weight activated switches.

One alternate selection provided is a pressure activated switch with normally an open circuit. The individual using the air cooler unit upon positioning in a predetermined location such as a seat of a golf cart having a pressure, the individual seated on the seat exerts physical contact and pressure on the switch that closes and actuates the circuit, this causes switching on and continuing activation of the air cooler unit for the duration the switch is actuated by the user exerting the physical pressure. Switches off the air cooler unit upon the user stops exerting pressure and leaving the leaving the predetermined location.

As to the manner of usage and operation of the present invention, the same should be apparent from the above description. Accordingly, no further discussion relating to the manner of usage and operation will be provided.

With respect to the above description then, it is to be realized that the optimum dimensional relationships for the steps of the method of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

With respect to the above description then, it is to be realized that details of the components and circuitry used in this invention that are common standard of practice and common commercially available are intentionally omitted in the description of this invention, keeping the details to the spirit of this invention and not deviating from explanation of details pertaining to this invention.

What is claimed is:

1. A method for reducing the amount and volume of cooled refrigerant that is generally necessary for cooling air for chilled air output adapted for intermittent usage and further optimizing and extending the duration of cooling functionality by deactivating the unit during the periods when cooling is not needed thus conserving the rate of expending pre-cooled refrigerant provided for cooling of air, the method comprising the steps of:

providing a portable air cooling system for cooling and directing of cooled air, generally for mobile use by a user including use in golf carts, the system comprising in combination an insulated portable casing, an air cooling assembly comprising refrigerant packs, air blower fans, a portable power source, at least one of the air blower fans providing circulation of external air through the insulated portable casing and around and between the refrigerant packs and further directing the cooled air flow in a direction selected by the user, the refrigerated/cooled refrigerant packs providing cooling of the external air, and a computer control unit, wherein the processor and programmer of the computer control unit providing regulation of the speed of the blower fans and further providing optimization of the efficiency of cooling function of the portable air cooling system;

providing microcomputer circuitry and logic for generating data format for the operational functions including signaling and activating the portable air cooling unit (30), including the blower fans, providing chilled air output upon the electronic sensors operably coupled with the microcomputer circuitry and logic continue sensing and locating the predefined object including an individual positioned within a predefined space range and the logic further generating signals, switching off and deactivating the blower fans and thus the output of chilled air upon the electronic sensors sensing no specific predefined object being positioned within the predefined range, the data format associates with the predefined object including the data format associated with the aspect of the individual located within the predefined space;

installing and storing in the memory of the microcomputer programs and data format including, data format associated with specific predefined object, data format associated with the dimensional aspect of the specific predefined range and programs and data format in part providing processing of signals and generating specific data format for triggering and executing specific functions associated with the portable air cooling system; and operably coupling the electronic sensors including proximity sensors with the microcomputer circuitry and logic, providing sensing and data format associated with the predefined positional aspect of the object including the data format of the location aspect of the individual positioned within a predefined range, the microcomputer circuitry and logic upon sensing and locating the signal associated with the individual to be within the predefined range generating signals regulating switching and maintaining activation of the cooling operations of the portable air cooling units (30) for the duration the predefined object is positioned within the predefined range, further including switching off of the portable air cooling unit and deactivating cooling operations upon the logic not sensing the positional data format aspect of the object being positioned not within the predefined range, further the air cooler system being reactivated by an individual encroaching within the predefined range.

2. The method set forth in claim 1 and further including the step of:
providing a mechanism (5) comprising at least a portable microcomputer further comprising a computer circuitry and logic and further comprising in combination at least a processor (15), programmer and logic (18), a memory (21), communication circuitry and protocol (27) adapted to exchange data format and providing active and operable coupling with a plurality of systems including portable computer and communication devices and smart phones and components including switches (33) and regulator (36) of the portable air cooling units.

3. The method set forth in claim 1 and further including the step of:
providing plurality methods and sensors for detecting the presence of a predefined object including a person located within a predefined range including active and passive motion sensors.

4. The method set forth in claim 1 and further including the step of:
providing plurality methods and sensors for detecting a predefined object including a person located within a predefined range including proximity sensors.

5. The method set forth in claim 1 and further including the step of:
providing plurality methods and sensors for detecting a predefined object including a person located within a predefined range including ultrasonic sensors.

6. The method set forth in claim 1 and further including the step of:
providing plurality methods and sensors for detecting a predefined object including a person located within a predefined range including touch sensors.

7. The method set forth in claim 1 and further including the step of:
providing plurality methods and sensors for detecting a predefined object including a person located within a predefined range using switches including pressure and weight activated switches; and
generally providing switch with normally open contact, the switch being placed in a predetermined location, an individual associate with this air cooling unit upon positioning in the predetermined location applying physical contact and exerting pressure actuating the switch providing closing circuit thus switching on and activating the air cooler unit providing output of chilled air for the duration the switch is being actuated by the pressure applied by positioning of the user, further the circuit being open upon the user providing the pressure moving away from the predetermined location providing switching off the air cooler unit.

8. The method set forth in claim 2 and further including the steps of;
providing communication circuitry and protocol (27) adapted for exchanging of data format and active and operable coupling of microcomputer circuitry and logic mechanism (10) with a plurality of remote systems including electronic air condition control module of a vehicle this the portable air cooling unit system.

9. The method set forth in claim 1 and further including the step of:
switching off of the portable air cooling unit upon the microcomputer logic sensing the predefined object located within the predefined range moving away from within the predefined range.

10. A method for reducing the amount and volume of the cooled refrigerant that is generally necessary for cooling air for chilled air output and further optimizing and extending the duration of cooling functionality, the method comprising the steps of:
providing an air cooling assembly comprising refrigerant packs;
using microcomputer circuitry and logic for generating data format for the operational functions including signaling, activating and regulating the speed of the blower fan thus providing plurality of blower fan speeds, operable coupling of temperature sensors with the microcomputer circuitry and logic providing the data format of external temperature aspect of the area, the data format associated with the temperature aspect including specific temperature setting are stored in the memory of the microcomputer circuitry and logic, microcomputer circuitry and logic upon sensing the outside temperature data the microcomputer circuitry and logic triggering and generating signals to vary and maintain speeds of the blower fan, further upon sensing temperature aspect data format being at a predefined generally lower temperature spectrum the microcomputer circuitry and logic generating signals and operating the blower an at a specific slower speed conserving the rate of expending pre-cooled refrigerant provided for cooling of air within the portable air cooling system.

* * * * *